United States Patent
Lindqvist et al.

(10) Patent No.: US 6,354,882 B1
(45) Date of Patent: Mar. 12, 2002

(54) PLUG

(75) Inventors: Roland Lindqvist, Huddinge; Per Gabrielsson, Hågersten; Ingvar Sjoqvist, Huddinge; Kaj Burman, Grillby, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/342,428

(22) Filed: Jun. 29, 1999

(30) Foreign Application Priority Data

Jun. 29, 1998 (SE) ................................. 9802344

(51) Int. Cl.⁷ .............................................. H01R 24/04
(52) U.S. Cl. ........................................ 439/668; 439/265
(58) Field of Search ................................. 439/668, 669, 439/700, 824, 675, 956, 825, 265

(56) References Cited

U.S. PATENT DOCUMENTS

| | | | |
|---|---|---|---|
| 4,988,315 A | | 1/1991 | Wharton ..................... 439/668 |
| 5,131,869 A | * | 7/1992 | Wharton ................. 439/668 X |
| 5,201,677 A | * | 4/1993 | Takayama ................... 439/668 |
| 5,261,838 A | | 11/1993 | Fujie ........................ 439/668 |
| 5,387,136 A | * | 2/1995 | Britton ....................... 439/668 |
| 5,569,053 A | * | 10/1996 | Nelson et al. ............... 439/668 |
| 5,593,323 A | | 1/1997 | Dernehl ..................... 439/668 |
| 5,626,496 A | * | 5/1997 | Hahn ......................... 439/668 |
| 5,704,812 A | | 1/1998 | Moji ......................... 439/668 |
| 5,775,952 A | * | 7/1998 | Lu ............................ 439/668 |
| 5,860,824 A | * | 1/1999 | Fan ........................ 439/669 X |
| 5,967,851 A | * | 10/1999 | Ozer et al. .................. 439/668 |

FOREIGN PATENT DOCUMENTS

| | | |
|---|---|---|
| DE | 42 11 228 | 10/1993 |
| EP | 0 550 945 | 7/1993 |
| SE | 507 275 | 5/1998 |

* cited by examiner

Primary Examiner—Brian Sircus
Assistant Examiner—Son V. Nguyen
(74) Attorney, Agent, or Firm—Burns, Doane, Swecker & Mathis, L.L.P.

(57) ABSTRACT

An adaptable plug is intended to be inserted into power supply hole devices. The plug comprises a grip member and an insertion member, wherein the insertion member comprises a first contact means for power connection at the bottom of the hole, and an adaptation member situated in front of the grip member. The adaptation member is provided with at least one electrically conducting adaptation means. The said adaptation means comprises a base and legs, wherein edges between the legs and the base form at least two connection areas, to be brought into contact to the inner wall of the power supply hole device for supplying power to the plug.

12 Claims, 2 Drawing Sheets

PLUG

This application claims priority under 35 U.S.C. §§119 and/or 365 to 9802344-3 filed in Sweden on Jun. 29, 1998; the entire content of which is hereby incorporated by reference.

The present invention rates to a plus such as an adaptable plug or contact, which can be inserted into a power supply hole device.

BACKGROUND

There are many portable applications of today such as cellular phones, radios and video games, which are powered or charged from an electrical system of a motor vehicle, such as a car.

It is common practice to insert a plug into the power supply hole device for a cigarette lighter in the motor vehicle, to obtain electrical power from the electrical system of the motor vehicle. However, the diameter of power supply holes varies from car manufacturer to car manufacturer. Inserted plugs loosens, whereby electrical contact failure occurs, for instance due to vibration when driving and the plug must be reinserted. It also occurs that the plugs get stuck in the hole, so they are difficult to get out.

The adapter plugs are designed to fit into different power supply hole devices. The outer dimensions of the cylindrical plug member to be inserted into the tubular power supply hole device are defined of the most narrow power supply hole device in the market and the length of that member is defined by the deepest supply hole. These conditions result in a long and thin plug insertion member.

In the top of this insertion member a tip terminal is situated for electrical connection with the bottom wall contact of the power supply hole device. Often this tip member is coil spring loaded to make the tip terminal flexible in the insertion direction. When the tip terminal is in contact with the bottom wall it is only possible to press the plug further into the hole as deep as the length of the tip terminal allows. The purpose of the tip terminal is to allow the plug to move a short distance backwards from the bottom hole contact without losing the electrical connection with the same. The Tip terminal is designed to fit into shallow tubular power supply hole devices and therefore the tip terminal is, as the insertion member is designed long quite short in length.

The electrical connection with the side wails of the tubular power supply hole device and the gripping and fastening inside the hole is provided by a number of spring contacts means protecting outwardly from the cylindrical member. These contact means are placed quite close the tip terminal. If they were placed in the other end of the insertion member instead there is a risk that the spring contacts never will reach into a shallow hole and the spring contacts will stay outside the hole without any possibility to contact the conducting side wall. However, the tubular inner wall is perforated with recesses, like holes and slits, that could destroy the spring contact means or even be destroyed by the contact means. Said recesses decrease the contact and grip area between the spring contacts and the side-walls and they are positioned closer to the bottom wall than the opening of the power supply hole device The outer area of the inner wall, close to the opening is not perforated and provides the best contact and grip areas in the hole. The known prior art plugs having the spring contact means positioned close to the tip member will only pass said outer area during the insertion.

In the prior art, there are several examples of plugs which can be fitted into holes of different diameters, such as 20, 8–22, 3 mm, without loosening even when exposed to vibration during driving etc, which plugs are also easy to unplug.

EP-A1-550 945 discloses a car plug which can be firmly fitted into a power supply hole device for a cigarette lighter in an automobile, enabling stable electric connection over a long period of time irrespective of the size of the power supply hole device. The car plug has a cylindrical member provided with spring contact means projecting outwardly from the cylindrical member, whereby the projecting spring contact means contact the inner surface of the power supply hole device to obtain electrical contact. It is the power terminal provided on the inner wall of the power supply hole device that presses the terminal in the radial direction, to constitute an electric circuit, when also the tip of the plug is connected to the power provided at the bottom of the power supply hole device.

In this prior art car plug it can be seen that the projecting spring contact means are squeezed and fixed and the electric circuit is obtained when the tip of the tip terminal contacts the power terminal provided at the central bottom of the power supply hole device by a coil spring when forcing the car plug into the power terminal provided at the central bottom of the power supply hole device.

A disadvantage with the prior art plugs is that the force pressing the contact means of the plug to the inner wall of the power supply hole device for powering is quite weak, whereby the plugs might loosen due to vibrations.

As stated above prior an adapter plugs have a number of drawbacks, which result in bad electrical contact, and fastening or gripping into said hole. Not even the above disclosed car plug solves all problems. In prior art, for instance the engagement area is small and the plugs engage deep in holes, whereby the pull-out force can be to low or if the spring terminal grab deep inside the hole where the cut-outs are located this might destroy the power supply insertion hole or the plug, or cause a short circuit.

SUMMARY

The present invention relates to an adaptable plug for facilitating firmly fitting into the power supply hole device for a cigarette lighter in a vehicle, such as an automobile, being able to obtain stable electric connection irrespectively of the size of the hole, which plug is also easy to dismount.

The adaptable plug according to the invention increases the forces pressing the contact means against the inner wall of the power supply holy device, by better adaptation to the inner wall of the hole compared to prior art plugs. Therefore, the contact means can also be said to work as "adaptation means", meaning that besides improved contacting, also the fitting of the plug to the inner wall of the power supply hole device is considerably increased.

Thus, in the following, contact mean are designated "adaptation means".

When using an adapter plug in a power supply hole device that is shallower than the maximum depth it is designed for, the long insertion member will cause the plug to protrude out of the hole. The more the plug protrudes, the easier it is that the plug will move out of the hole and loose its electrical connection to the bottom wall contact as a result of the car vibrations and chokes.

This problem is solved according to the invention by designing the insertion member of the plug to the shallowest power supply hole device instead of the deepest and the length of the flexible movement of the tip terminal to the difference between the shallowest and the deepest hole. Always insert the whole insertion member and still have god contact with bottom wall contact.

Another problem to be solved is the bad fastening and gripping of the plug into the power supply hole device. This is solved according to the invention by placing the spring contacts means close to the rear end of the insertion member. When the insertion member has been fully inserted in the hole the spring contact means will be positioned on the outer area of the inner wall with the best electrical contact and the best fastening and gripping conditions because there is no recess in said area.

One further problem to be solved is that the design of tie prior art spring contact means is a limitation of the electrical contraction with the inner wall in the hole and the adaptation of the spring contacts means to the radius of the hole. To improve these features a new spring contact means is invented. Said spring contact means will adapt better to the radius of the hole and will work as a sort of electrically conducting adaptation means. This invented adaptation means has an essentially U-shaped cross section perpendicular to the insertion direction. This U-shaped adaptation means has a base and two longish legs or sidewalls extending perpendicular from the base along the two of the opposite base sides. The other two opposite sides, the front end and back end, have no legs. The front end is directed against a top of the insertion member. This construction has a two step adaptation function. The legs of the U-shaped adaptation means is first bent. The magnitude of the force to bend the legs is less than the force to bend the base of the adaptation means. First when the legs is bent as much as possible the base of the adaptation means is bent if necessary.

Yet another problem is to make it easier to insert the plug into the power supply hole device. If the width of the base is increasing from the front of the adaptation means to the back end, this will increase the force needed for inserting the plug during the insertion. When the plug is fully inserted the force needed to pull the plug out of the hole therefore is maximised and the needed pulling force will reduce the more the plug is pulled out of said hole. Said two step adaptation function will also improve the insertion of the plug, In the beginning of the insertion where the base is narrower the legs will be bent. When the plug is fully inserted the base could also have been beat by the force from the inner wall of the hole, especially if the radius is small.

According to a preferred embodiment of the invention, the adaptable plug is designed to be inserted into power supply hole device devices of different depth and radius, each hole device having an inner wall, said plug comprising a grip member and an insertion member, wherein said insertion member comprises a first contact for power connection at the bottom of the hole and an adaptation member having adaptation means for electrical power connection with the inner wall and situated in front of said grip member, wherein said adaptation means is/are separated from said grip member by a ring member, which bears on an opening edge of the power supply hole device and positions the adaptation means alongside with an outer area (OA) of said inner wall when the plug is fully inserted into the power supply hole device.

The adaptable plug is provided with contact means for powering, working radially, thereby grabbing in the inner wall of the hole in at least two points, preferably four points, if two contact means are employed, which increases the friction area in the power supply hole device, Preferably, the adaptation means, comprising a base and legs is/are essentially U-shaped in cross section, extending in the longitudinal direction of said adaptation member, gripping around said adaptation member by its legs, wherein edges between said legs and base form at least two connection areas, to be brought into contact to the inner wall of said power supply hole device for supplying power to said adaptable plug.

According to yet another embodiment of the invention, the adaptation means operate/-s according to a two step adaptation function, which implies that the insertion of the plug into the hole device the legs are bent as much as possible before the base of the adaptation means is bent.

Preferably, the width in radial direction of said adaptation means is larger than the diameter of the insertion member and the hole, whereby said adaptation member is brought into contact with the inner wall of said power supply hole device, wherein at least two connection areas are obtained.

Preferably, the adaptable plug is adapted to fit holes of a length of 25–40 mm, in particular 28, 5–39 mm.

The adaptable plug does not come off even at intensive vibrations, even if it is fitted in a large hole, and can be fitted into small holes, without implying any problems with dismounting. The adaptable plug fits holes with different diameters, and grabs just inside the hole, where there are no cutouts. Furthermore, the tip of the plug takes up different lengths of holes. An advantage is that the plug does not project a long distance from the hole, to avoid loose fitting. Another advantage is that the adaptation means always grabs where there are no cutouts.

BRIEF DESCRIPTION OF THE DRAWINGS

The present invention will now be described in more detail with reference to preferred embodiments of the invention, given only by way of examples, and illustrated in the accompanying drawings in which:

FIG. 2b is a vertical sectional view on the central line 2B—2B in FIG. 2a.

DETAILED DESCRIPTION

Figure 1:
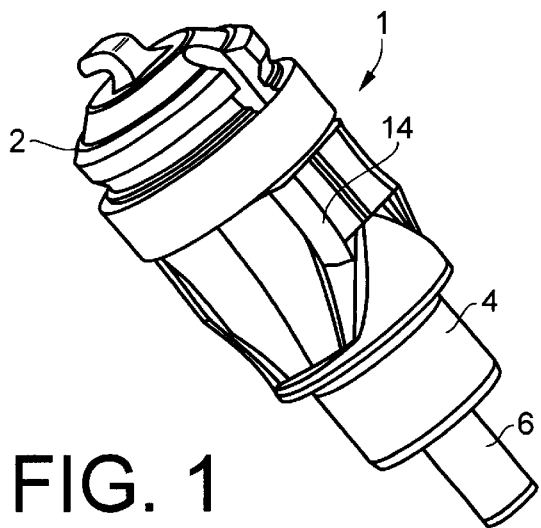
FIG. 1 is a perspective view illustrating an embodiment of the invention.
Figure 2A:
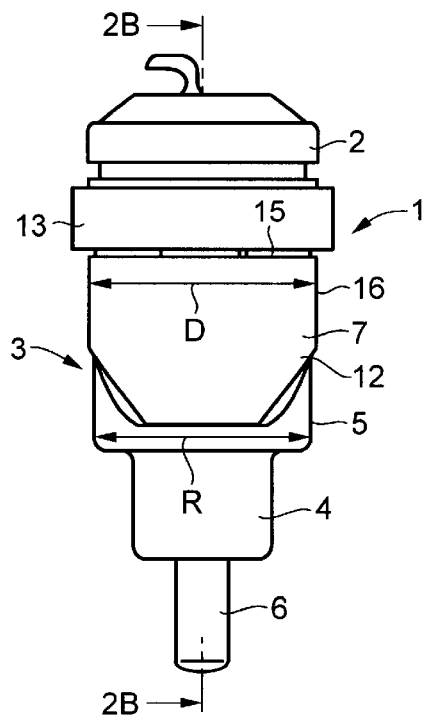
FIG. 2a is a front view of an embodiment of the present invention.
Figure 2B:
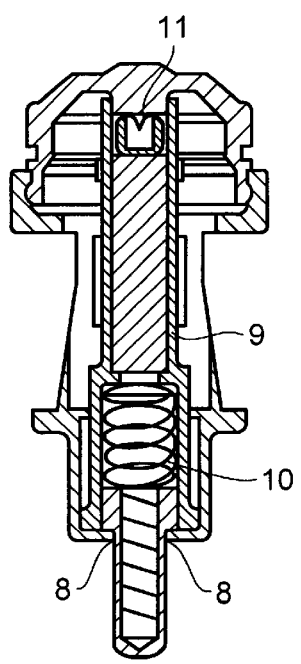

According to an embodiment of the invention illustrated FIGS. 1 and 2a there is provided an adaptable plug 1 intended to be inserted into a power supply hole device 20, said plug 1 comprising a grip member 2 and an insertion member 3, wherein said insertion member 3 comprises a first contact means 6 for power connection at the bottom of the hole, and an adaptation member 5, situated in front of said grip member 2, wherein said adaptation member 5 is provided with at least one electrically conducting adaptation means 7, wherein said adaptation means 7, comprising a base 15 and legs 14, is essentially U-shaped in cross-section, extending in the longitudinal direction of said adaptation member 5, gripping around said adaptation member 5 by its legs 14, wherein edges 16 between said legs 14 and base 15 forms at least two connection areas 12, to be brought into contact to the inner wall of said power supply hole device for supplying power to said adaptable plug 1.

The first member 4 is preferably essentially cylinder shaped and is preferably provided with a flange on its base side and a hole 8 in the bottom part through which the tip terminal 6 is moveable. The first member 4 can also be totally integrated into the adaptation member 5 and is not necessary.

The distance D in radial direction, i. e. the width of the base 15 of said adaptation means 7 is larger than the diameter R of the insertion member 3 and the maximum diameter of the power supply hole device 20, whereby said adaptation means 7 is/are brought into contact to the inner wall of said hole, whereby at least two connection areas 12 are obtained.

Preferably, two adaptation means 7 are symmetrically arranged, whereby four connection areas 12 are obtained.

Figure 2C:
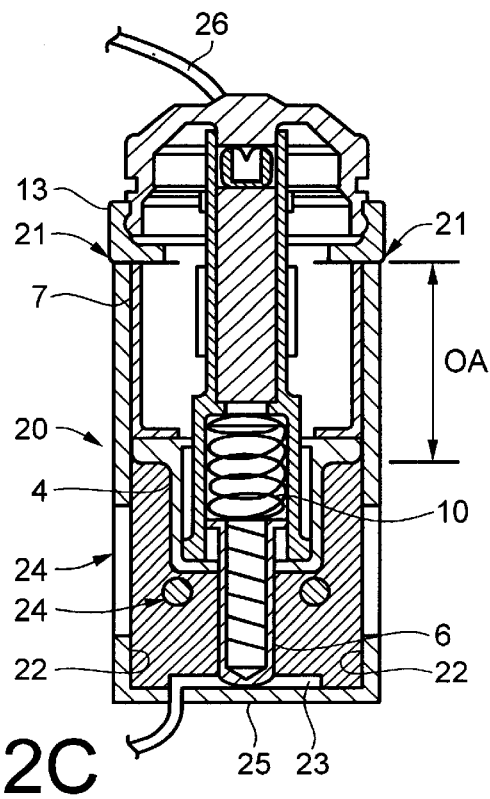
FIG. 2c illustrates a cross-section of an adaptable plug, which is inserted into a power supply hole device.

FIG. 2C illustrates a cross-section of a plug 1, which is inserted into a power supply hole device 20. The plug 1 is fully inserted into the hole device and the ring member 13 bear on the edge 21 of the power supply hole device 20 surrounding the opening. The first contact means 6, that is the tip terminal 6, is at least so long that it will reach the electrical bottom contact 23 before a bottom surface of the ring member 13 reaches the edge 21. The spring loaded tip terminal 6 will be pushed into the cavity of the first member 4, where the spring 10 is situated, when the grip member 2 and ring member 13 are pushed towards the edge of the opening.

The electrically conducting adaptation means 7 and the outer area OA of the inner wall are now lying alongside each other. The ring-shaped outer area OA of the inner wall 22 is not perforated and provides the best contact and grip areas in the power supply hole device. Closer to the bottom of the hole the inner wall 22 is perforated with recesses 24, like holes and slits, that often destroy prior art contact means or even are destroyed by sad contact means 7. Said recesses 24 decrease available surface area on the side walls to provide sufficient electrical and mechanical contact between the spring contacts 7 and the side wall, and they are positioned closer to the bottom wall 25 than the opening of the power supply hole device. Said recesses are necessary to hold a cigarette lighter.

The grip member 2 of the plug 1 and the electrical conductor 26 are the only things that protrude out of the hole. The plug will not move out of the hole and loose its electrical connection to the bottom wall contact due to the vehicle vibrations and chokes.

Figure 3:
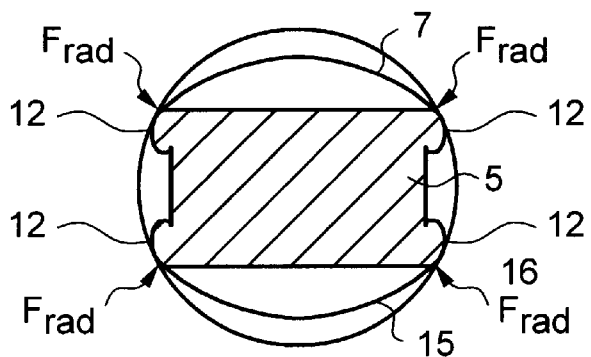
FIG. 3 is a plan view perpendicular to the insertion direction, illustrating the embodiment of the present invention illustrated FIG. 1 inserted into a power supply hole device.

FIG. 3 illustrates how the forces act on the adaptation means 7. The base 15 of the adaptation means 7 is bent to the inner wall of the power supply hole. Two adaptation means are illustrated, obtaining four connection areas 12 at the edges 16.

Figure 4A:
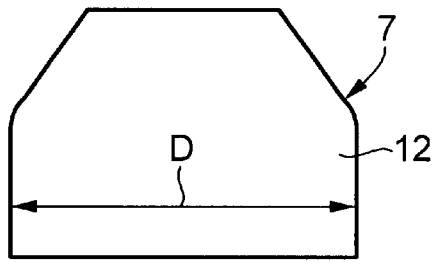
FIGS. 4a–c illustrate the adaptation means to be mounted an the adaptation member illustrated in FIG. 1–2.

Preferably, the width D of said adaptation means 7 decreases in a first portion of said adptation means 7, to facilitate insertion of the plug 1 into the power supply hole, which is illustrated in more detail in FIG. 4a.

According to yet an embodiment of the invention the adaptable plug 1 comprises a grip member 2 and an insertion member 3, wherein said insertion member 3 comprises a first member 4 in the end to be inserted, provided with a hole 8 through which an essentially cylindrical tip terminal as a first contact means 6, provided with a flange at its base side, is moveable, and an adaptation member 5, an inner member 9 solidly provided partly inside said first member 4 wherein said inner member 9 protrudes towards said grip member 2 and is solidly attached thereto, a ring member 13 attached to and comprised in the grip member 2, a spring, such as a coil spring 9 provided in between said grip member 2 and said tip terminal 6 inside said plug 1, and wire lead connections 11, wherein said adaptation member 5 is provided with at least one, preferably two electrically conducting adaptation means 7, wherein said adaptation means 7, comprising a base 15 and legs 14, U-shaped in cross section, extending in the longitudinal direction of said adaptation member 5 gripping around said adaptation member 5 by its legs 14, wherein edges 16 between said legs 14 and base 15 form at least two connection areas 12, to be brought into contact to the inner wall of said power supply hole for supplying power to said adaptable plug.

The adaptation means 7 are folded and protruded in the radial regions to contact the power terminal provided on the inner wall of the power supply hole for a cigarette lighter, for electrical connection. It is essential that the adaptation means 7 are folded to be flexible in radial direction. Furthermore, the adaptation means 7 can have a wire lead 11 for connection to the cord connected to the apparatus in the vehicle.

The adaptation means 7 can be made of sheet metal, or of a non-conducting material, such as polymeric material, provided with a conductor thereon.

Figure 4B:
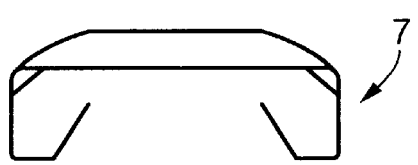
Figure 4C:
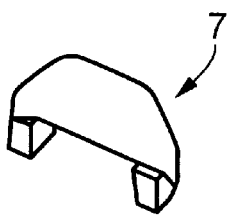

The adaptation means 7 are preferably made of folded sheet meal and are further illustrated in FIGS. 4a–c.

Figure 4D:
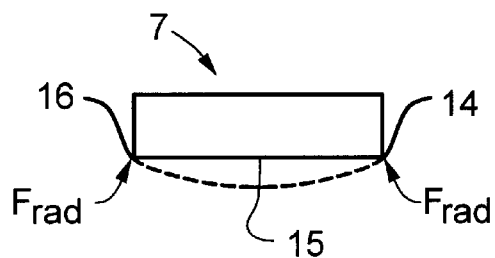
FIG. 4d illustrates the forces acting on the adaptation means according to the present invention in cross-section.

In FIG. 4d, the operation of the adaptation means 7 is illustrated in more detail. The adaptation means 7, comprising a base 15 and line 14, are essentially U-shaped in a cross-section, perpendicular to the central line A—A in FIG. 2a. The forces acting onto said adaptation means work radially, which is indicated with arrows designated $F_{rad}$.

Figure 4E:
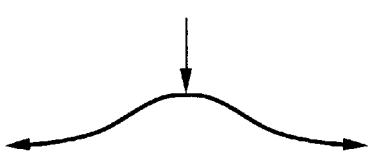
FIG. 4e illustrates the forces on a conventional sheet metal spring in cross-section as disclosed in for instance EP-A1-550 945.

Compared to the contact means according to prior art, illustrated in FIG. 4e, this increases the forces acting on said adaptation means 7 considerably. In FIG. 4e it is evident that prior art only accomplish one connection area, compared to two areas for each adaptation means 7 according to the invention. It is obvious from the figures that a larger connection area 12 is obtained when using adaptation means 7 according to the invention. The broken line in FIG. 4d illustrates how the adaptation means 7 are bent by the forces acting thereon.

It is also possible to exchange one of the adaptation means 7 by for instance a rib etc., to obtain three connection areas 12, in which one is non conductive. However, this decreases the contact area. It is also possible to use non-conductive adaptation means 7 and provide the plug with conventional second contact means for power supply.

The grip member 2 can comprise a hole through which the wire leads 11 are connected to apparatuses in the vehicle.

The contact means 6 can be made of metal and preferably shaped like a cap with U-shaped section. However, the invention is not limited thereto. Other shapes are possible.

The inner member 9 extends from the first member 4 and can be concentrically arranged around the flange of the tip terminal 6. However, it is possible to use any shape fitting inside the plug 1.

The ring member 13 is preferably made of the same material as the plug 1, but is not limited thereto.

If different voltages are required, it is also possible to transform the usual 12 volt current to any other required voltage before utilized in powering or recharging an appliance. This can be obtained by using different voltage transformers and incorporate them into the grip member 2.

It is also possible to provide the plug 1 with noise filter. This does not, however, change the principle of the present invention, which is to improve fitting of a car plug 1 in a power supply insertion hole by means of improved force acting on the adaptation means 7, i.e., powering terminals.

It will be appreciated by those of ordinary skill in the art that the number of applications above are primarily for the purpose of illustration and are not meant to imply any limitation of the present invention.

What is claimed is:

1. An adaptable plug designed to be inserted into a power supply receptacle having one of a plurality of conventional diameters and one of a plurality of conventional depths, the receptacle being closed on a first end by a bottom wall having a first power terminal, and open on a second end having an opening edge, the receptacle further including a tubular shaped inner wall extending in a longitudinal direction from the bottom wall to the opening edge and having a second power terminal, said plug comprising:

a grip member;

a ring member having a top surface coupled to the grip member and a diameter greater than an inside diameter of the receptacle, such that a bottom surface of the ring member rests against the opening edge when the plug is fully inserted into the receptacle; and an insertion member coupled to the bottom surface of the ring member and having a length approximately equal to a shallowest of the conventional depths, said insertion member including a first contact having a flange at one and and movable within in a cavity in the insertion member, a portion of the first contact opposite the flange being extendable from a contact opening in an end of the insertion member opposite the ring member, such that the extendable portion of the first contact is in contact with the first power terminal when the plug is fully inserted into the receptacle; and an adaptation member disposed between the first contact of the insertion member and the ring member having adaptation means for providing an electrical connection with the second power terminal and for removably coupling the plug to the inner wall of the receptacle, said adaptation means being essentially U-shaped in cross section and extending in a longitudinal direction along said adaptation member, the adaptation means comprising a base and a plurality of legs extending from respective opposite sides of the base, the legs being adapted to couple the adaptation means to said adaptation member by gripping around said adaptation member, wherein edges disposed between said legs and the base form at least two connection areas to be brought into contact to the second power terminal for supplying power to said adaptable plug.

2. The adaptable plug according to claim 1, wherein when the plug is inserted into the receptacle, the legs of the adaptation means are bent as much as possible before the base of the adaptation means is bent.

3. The adaptable plug according to claim 1, wherein a radial width of said adaptation means decreases in a first portion of said adaptation means, to facilitate insertion of the plug into the receptacle.

4. The adaptable plug according to claim 1, wherein said adaptation means are made of folded sheet metal.

5. The adaptable plug according to claim 1, wherein said first contact is a tip terminal.

6. The adaptable plug according to claim 1, wherein said first contact means is a tip terminal, and the portion of the first contact being extendable from the contact opening is extendable a distance equal to a difference between a shallowest and a deepest of the plurality of conventional depths of the receptacle which the plug is adaptable.

7. The adaptable plug according to claim 1, wherein said plug further comprises:

an inner member solidly attached inside the plug to said grip member and extending through the ring member into the insertion member in a direction toward the cavity;

a spring disposed between said inner member and the flange of the first contact; and a pair of wire lead connections extending into the plug through an opening in the grip member, one wire lead connecting to the first contact and the other wire lead connecting to the adaptation means, wherein the spring exerts a force on the first contact sufficient to place the extendable portion of the first contact in contact with the first power terminal when the plug is fully inserted into the receptacle for delivering power to said adaptable plug.

8. An adaptation means for use on an adaptation member of an adaptable plug, comprising:

a base; and a plurality of legs extending from respective opposite sides of the base, the legs being adapted to couple the adaptation means to the adaptation member by gripping around said adaptation member, wherein edges disposed between said legs and said base form at least two connection areas to be brought into contact to a power terminal located on an inner wall of a power supply receptacle for supplying power to said adaptable plug and for removably coupling the plug to the inner wall of the receptacle, and the adaptation means is essentially U-shaped in cross section and extends in a longitudinal direction along the adaptation member.

9. The adaptation means according to claim 8, wherein when the plug is inserted into the receptacle, the legs of the adaptation means are bent as much as possible before the base of the adaptation means is bent.

10. The adaptation means according to claim 8, wherein a radial width of said adaptation means decreases in a first portion of said adaptation means, to facilitate insertion of the plug into the receptacle.

11. The adaptation means according to claim 8, wherein said adaptation means is made of folded sheet metal.

12. The adaptable plug according to claim 1, wherein a portion of said insertion member extending from the contact opening toward the ring member has a smaller diameter than the remaining portion of the insertion member to facilitate insertion of the plug into the receptacle.

* * * * *